US011556331B2

(12) United States Patent
Sawada

(10) Patent No.: US 11,556,331 B2
(45) Date of Patent: *Jan. 17, 2023

(54) PROGRAM UPDATE MANAGEMENT DEVICE

(71) Applicant: Toyota Jidosha Kabushiki Kaisha, Toyota (JP)

(72) Inventor: Shinji Sawada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 87 days.

This patent is subject to a terminal disclaimer.

(21) Appl. No.: 17/107,092

(22) Filed: Nov. 30, 2020

(65) Prior Publication Data

US 2021/0109741 A1    Apr. 15, 2021

Related U.S. Application Data

(63) Continuation of application No. 16/353,045, filed on Mar. 14, 2019, now Pat. No. 10,877,742.

(30) Foreign Application Priority Data

Mar. 16, 2018    (JP) .............................. JP2018-049197

(51) Int. Cl.
  *G05B 19/048*    (2006.01)
  *G06F 8/65*    (2018.01)
  (Continued)

(52) U.S. Cl.
  CPC ............ *G06F 8/65* (2013.01); *B60R 16/0231* (2013.01); *B60R 16/023* (2013.01); *B60R 25/30* (2013.01);
  (Continued)

(58) Field of Classification Search
  CPC . G06F 8/65; G06F 8/658; G06F 8/654; G06F 8/60; G06F 3/06; G06F 11/36;
  (Continued)

(56) References Cited

U.S. PATENT DOCUMENTS 9,348,577 B2 *    5/2016    Hoffman ............. G06F 11/1464
9,524,160 B2    12/2016    Takahashi et al.
(Continued)

FOREIGN PATENT DOCUMENTS

JP    2006-257915 A    9/2006
JP    2010-195111 A    9/2010
JP    2011079496 A    4/2011

OTHER PUBLICATIONS

U. Jyothi Kameswari et al., A Design Model for Automatic Vehicle Speed Controller, Dec. 2011, [Retrieved on Oct. 21, 2022]. Retrieved from the internet: <URL: https://d1wqtxts1xzle7.cloudfront.net/56010580/pxc3976166-with-cover-page-v2.pdf?> 7 Pages (19-24) (Year: 2011).*

(Continued)

*Primary Examiner* — Anibal Rivera
(74) *Attorney, Agent, or Firm* — Dinsmore & Shohl LLP

(57) ABSTRACT

Provided is a program update management device that includes: an acquiring part that acquires a scene signal indicating a scene in which a vehicle is used; a determining part that determines a level indicating how strongly the vehicle is restricted when respective functions of a plurality of ECUs are impaired, the plurality of ECUs each having the same function in the scene indicated by the scene signal; and a selecting part that selects, from among the plurality of ECUs, an ECU for which a program update is performed, based on the level.

6 Claims, 5 Drawing Sheets

(51) Int. Cl.
*B60R 16/023* (2006.01)
*B60R 25/30* (2013.01)
*G06F 8/654* (2018.01)
*G06F 8/658* (2018.01)
*G06F 8/60* (2018.01)
*G06F 11/36* (2006.01)
*G06F 3/06* (2006.01)
*G06F 11/14* (2006.01)
*G06F 13/42* (2006.01)

(52) U.S. Cl.
CPC .............. *G05B 19/048* (2013.01); *G06F 3/06* (2013.01); *G06F 8/60* (2013.01); *G06F 8/654* (2018.02); *G06F 8/658* (2018.02); *G06F 11/1433* (2013.01); *G06F 11/36* (2013.01); *G06F 13/42* (2013.01)

(58) Field of Classification Search
CPC . G06F 11/1433; G06F 13/42; B60R 16/0231; B60R 25/30; B60R 16/023; H04L 67/34; H04L 67/12; H04L 29/12; H04L 29/06; H04L 29/08; G05B 19/048
See application file for complete search history.

(56) References Cited

U.S. PATENT DOCUMENTS

| | | | |
|---|---|---|---|
| 10,514,900 | B2 | 12/2019 | Teraoka et al. |
| 10,637,657 | B2 | 4/2020 | Haga et al. |
| 2012/0323402 | A1 | 12/2012 | Murakami |
| 2013/0139018 | A1 | 5/2013 | Takada et al. |
| 2014/0136826 | A1* | 5/2014 | Paek .................... G06F 8/65 713/1 |
| 2015/0301822 | A1* | 10/2015 | Takahashi ............ B60R 16/023 717/173 |
| 2015/0358329 | A1 | 12/2015 | Noda et al. |
| 2016/0359893 | A1 | 12/2016 | Kishikawa et al. |
| 2016/0373449 | A1 | 12/2016 | Haga et al. |
| 2017/0026492 | A1 | 1/2017 | Kawamura et al. |
| 2017/0123784 | A1 | 5/2017 | Zymeri et al. |
| 2017/0134164 | A1 | 5/2017 | Haga et al. |
| 2017/0242678 | A1* | 8/2017 | Sangameswaran ....... G06F 8/65 |
| 2017/0262277 | A1 | 9/2017 | Endo et al. |
| 2017/0327087 | A1 | 11/2017 | Nonaka |
| 2018/0018160 | A1 | 1/2018 | Teraoka et al. |
| 2018/0032324 | A1 | 2/2018 | Sarkar et al. |
| 2018/0074811 | A1* | 3/2018 | Kiyama ............. G06F 11/1433 |
| 2018/0302422 | A1 | 10/2018 | Kishikawa et al. |
| 2019/0031203 | A1 | 1/2019 | Fox |
| 2019/0057214 | A1* | 2/2019 | Xia ...................... H04W 12/06 |
| 2019/0205115 | A1 | 7/2019 | Gomes |
| 2019/0235855 | A1* | 8/2019 | Nakano ................... H04B 7/14 |
| 2019/0260790 | A1 | 8/2019 | Kishikawa et al. |
| 2019/0268420 | A1* | 8/2019 | Acharya ................ H04L 67/34 |
| 2019/0340116 | A1* | 11/2019 | Miyauchi ............ G06F 11/2038 |
| 2019/0384522 | A1 | 12/2019 | Yun et al. |
| 2020/0159180 | A1* | 5/2020 | Ishigooka ................ G05B 9/03 |

OTHER PUBLICATIONS

Thomas Strang et al., Communication Technologies for Vehicles, Mar. 2011, (Retreived on Aug. 17, 2020), Retrieved from the Internet; <URL: https://link.springer.com/content/pdf/10. 1007% 2F978-3-642-19786-4.pdf> 250 Pages (1-237) (Year: 2011).

Jittiwut Suwatthikul, Fault detection and diagnosis for in-vehicle networks, 2010, (Retreived on Aug. 17, 2020). Retrieved from the Internet; <URL: https://pdfs.semanticscholar.org/3a26/ 7a04f640b237ecfb198053491dd137d3d854.pdf>26 Pages (284-306) (Year: 2010).

U.S. Appl. No. 16/353,045, filed Mar. 14, 2019, Shinji Sawada.

* cited by examiner

FIG.3

| SCENE | | ILLUMINANCE | |
| --- | --- | --- | --- |
| | | LESS THAN THRESHOLD | EQUAL TO OR HIGHER THAN THRESHOLD |
| STOPPED | WITH PASSENGER | A | B |
| | WITHOUT PASSENGER | B | B |
| DRIVING | UNDER ELEVATED STRUCTURE INSIDE TUNNEL VICINITY OF THE ABOVE | A | B |
| | DEVELOPER SITE DEALER CIRCUIT | B | B |

*FIG.4*

| LEVEL | PROGRAM UPDATE PERMITTED/NOT PERMITTED | |
| --- | --- | --- |
| | ECU6 | ECU7 |
| A | PROGRAM UPDATE NOT PERMITTED | PROGRAM UPDATE PERMITTED |
| B | PROGRAM UPDATE PERMITTED | PROGRAM UPDATE PERMITTED |

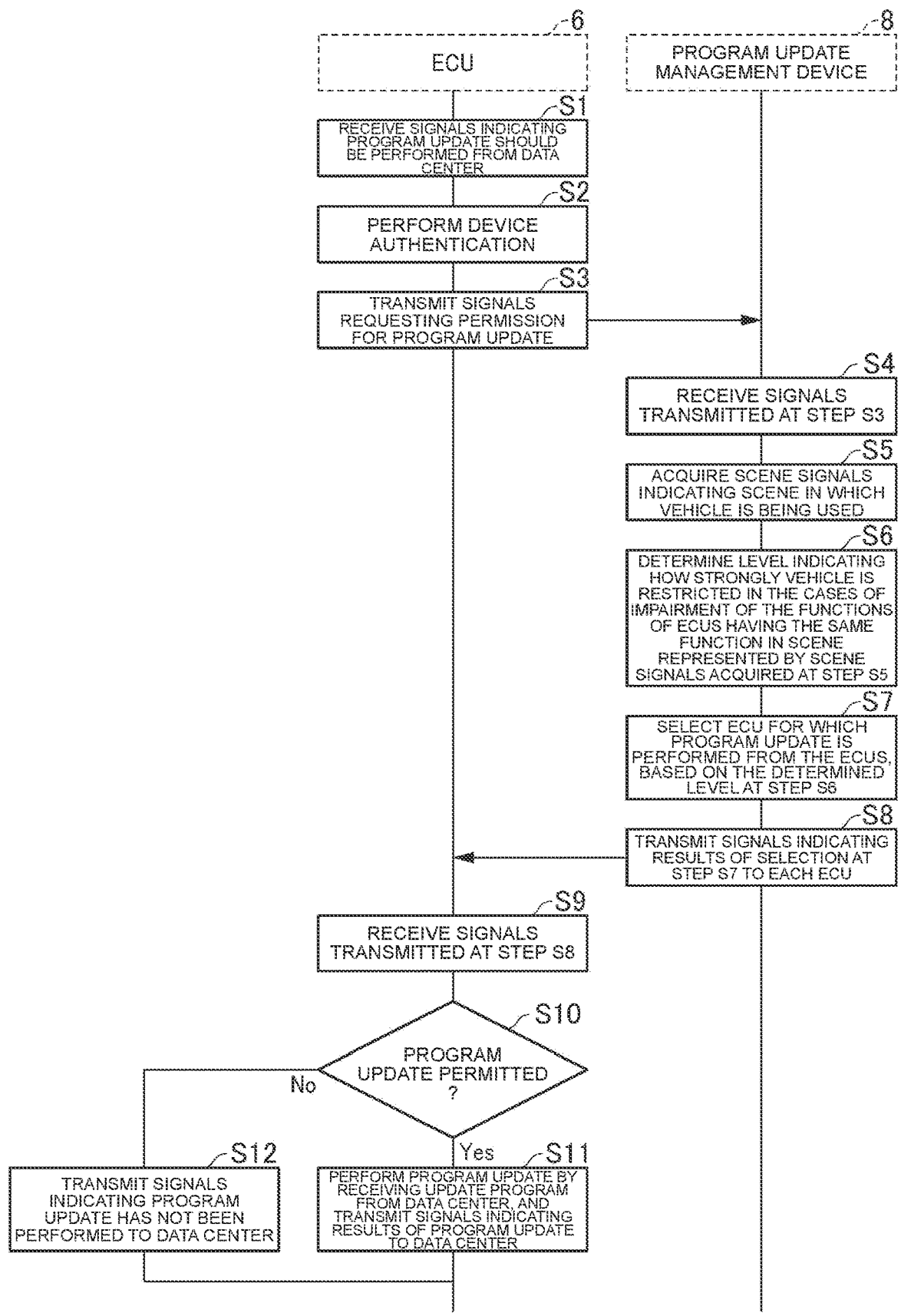

PROGRAM UPDATE MANAGEMENT DEVICE

CROSS-REFERENCES TO RELATED APPLICATIONS

This application is a continuation of U.S. patent application Ser. No. 16/353,045 filed on Mar. 14, 2019, now U.S. Pat. No. 10,877,742 which claims priority from Japanese Patent Application No. 2018-049197, filed on Mar. 16, 2018, the entire disclosure of which is incorporated herein by reference.

BACKGROUND

Field

The present disclosure relates to a device for managing program updates.

Description of Related Art

Currently available automobiles are equipped with a plurality of microcomputers, which are called electronic control units (ECUs). These ECUs control the operation of the automobile by communicating with each other to receive and transmit data therebetween. Such ECUs need to appropriately perform program updates.

For example, JP2011-079496 A discloses a vehicle control apparatus that is configured to: determine whether a program of a controller needs to be updated; when the program update is necessary, determine whether the controller performs control processing while the vehicle is driving; and when a determination is made that the controller does not perform control processing, update the program of the controller while the vehicle is driving.

In the vehicle control apparatus disclosed in JP2011-079496 A, however, the program of the controller is not updated if it is determined that the controller is performing control processing, and this can result in the program update being unable to be made at an early stage.

SUMMARY

In view of the above-described circumstances, an object of the present disclosure is to provide a program update management device that enables a program update to be performed at an early stage.

A program update management device according to an aspect of the present disclosure comprises: an acquiring part that acquires a scene signal indicating a scene in which a vehicle is used; a determining part that determines a level indicating how strongly the vehicle is restricted when respective functions of a plurality of ECUs are impaired, the plurality of ECUs each having the same function in the scene indicated by the scene signal; and a selecting part that selects, from among the plurality of ECUs, an ECU for which a program update is performed, based on the level.

BRIEF DESCRIPTION OF DRAWINGS

FIG. 3 is a chart showing an example of the relationship between each scene and a level of a vehicle indicating how strongly the vehicle is restricted when the function of an ECU is impaired according to an embodiment.

FIG. 4 is a chart showing an example of the relationship between the updatability of a program of each ECU and a level of a vehicle indicating how strongly the vehicle is restricted when the function of an ECU is impaired according to an embodiment.

FIG. 5 is a sequence diagram showing an example of processing performed by a program update management device and an ECU according to an embodiment.

DETAILED DESCRIPTION

Figure 1:
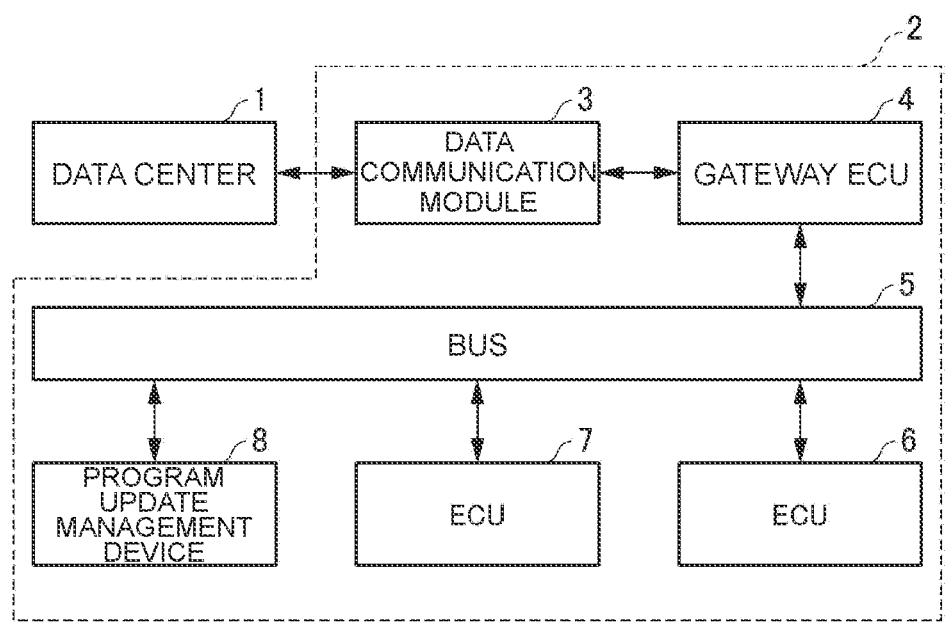
FIG. 1 illustrates a data center, a data communication module, a gateway ECU, a bus, ECUs, and a program update management device according to an embodiment, together with how these components are related to each other.

Hereinafter, embodiments of the present disclosure will be described with reference to the attached drawings. In the drawings, elements given the same reference numeral have similar configurations.

In reference to FIG. 1 through FIG. 4, description will be made of a data center, a data communication module, a gateway ECU, a bus, other ECUs, and a program update management device according to an embodiment, as well as a description of the relationship among these components.

A data center 1 transmits, to a vehicle 2, signals indicating that a program update should be performed, together with an update program, and receives, from the vehicle 2, signals indicating the result of the program update or signals indicating that the program update has not been performed.

As illustrated in FIG. 1, the vehicle 2 includes a data communication module (DCM) 3, a gateway ECU 4, a bus 5, an ECU 6, an ECU 7, and a program update management device 8.

The data communication module 3 transmits/receives signals and data to/from the data center 1.

The gateway ECU 4 performs authentication of devices with the data center 1. If the authentication is performed successfully, the gateway ECU 4 relays signals and data which are to be transmitted and received between the data communication module 3 and the ECU 6 or ECU 7.

The bus 5 is connected to each of the program update management device 8, the gateway ECU 4, the ECU 6 and the ECU 7, so that they can communicate with each other. Examples of the communication protocol employed in the bus 5 include LIN (Local Interconnect Network) and CAN (Controller Area Network).

The ECU 6 and ECU 7 each control a component of the vehicle 2 and such components have the same function. For example, the ECU 6 controls the right headlight of the vehicle 2, wherein the ECU 6 acts as a master of the ECU 7 for such control of the right headlight. The ECU 7 controls the left headlight of the vehicle 2, wherein the ECU 7 acts as a slave of the ECU 6 for such control of the left headlight. Since the right and left headlights have the same function, the ECU 6 and the ECU 7 also have the same function. In the below description, the ECU 6 will be described as an example, but the same will also apply to the ECU 7.

Figure 2:
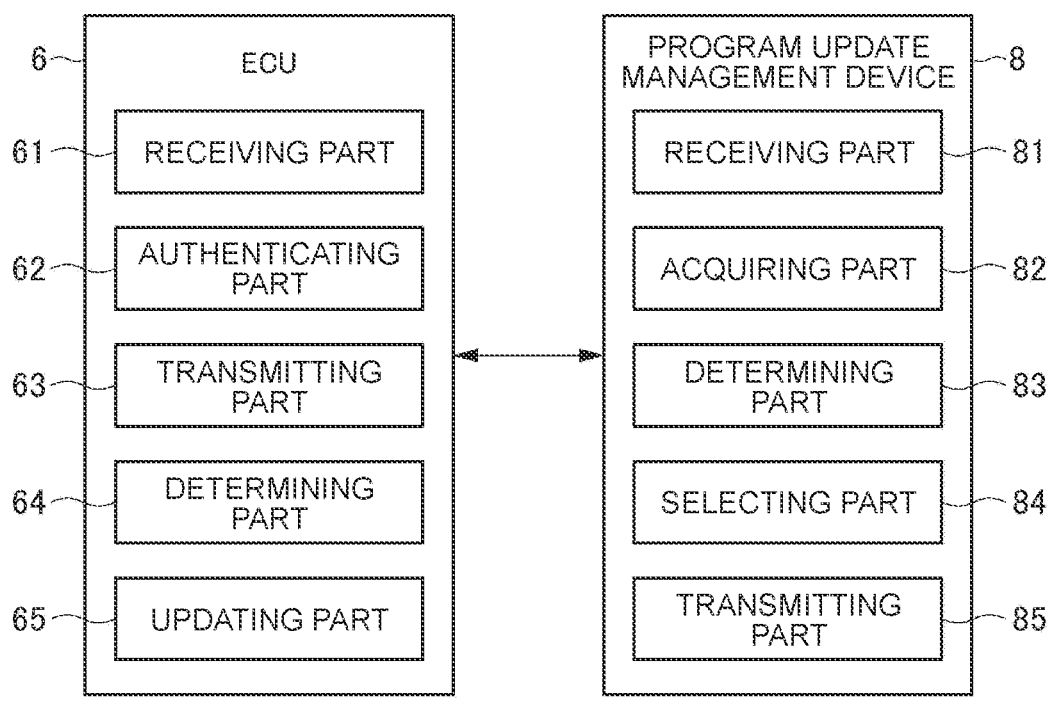
FIG. 2 illustrates examples of a program update management device and an ECU according to an embodiment.

As shown in FIG. 2, the ECU 6 includes a receiving part 61, an authenticating part 62, a transmitting part 63, and a determining part 64. The receiving part 61 receives signals indicating that a program update should be performed from the data center 1. The authenticating part 62 performs authentication of devices with the gateway ECU 4. The transmitting part 63 transmits signals requesting permission for a program update to the program update management device 8, and also transmits, to the data center 1, signals indicating the results of the program update or signals indicating that the program update has not been performed. The determining part 64 determines whether a program update can be performed. An updating part 65 receives an update program from the data center 1 to perform a program update, and transmits signals indicating the results of the program update to the data center 1. The updating part 65 alternatively transmits signals indicating that the program update has not been performed to the data center 1.

As shown in FIG. 2, the program update management device 8 includes a receiving part 81, an acquiring part 82, a determining part 83, a selecting part 84 and a transmitting part 85. The program update management device 8 may include at least the acquiring part 82, determining part 83 and selecting part 84, and may further include components other than the components shown in FIG. 2. Furthermore, regarding at least one of the components of the program update management device 8, the program update management device 8 may use a different device that has a similar function to that of the component. For example, the program update management device 8 may leave the function of the determining part 83 to the gateway ECU 4. The program update management device 8 may be implemented by, for example, an ECU.

The receiving part 81 receives signals requesting permission for a program update from the transmitting part 63.

The acquiring part 82 acquires scene signals indicating a scene in which the vehicle 2 is used. The term "scene," as used herein, means at least one of the state of use of the vehicle 2 by the passenger(s) and the conditions around the vehicle 2. The state of use of the vehicle 2 by the passenger(s) may indicate, for example, that the vehicle 2 is stopped, the vehicle 2 is driving, or the vehicle 2 has passenger(s) or no passengers, as shown in FIG. 3. The conditions around the vehicle 2 represent at least one of: the place where the vehicle 2 is located; and facilities and/or constructions located near the vehicle 2 or near the place of the vehicle 2, and examples include "under the elevated structure," "inside a tunnel," "in the vicinity of a site under the elevated structure or inside a tunnel," "a developer site," "a dealer" and "a circuit," as shown in FIG. 3.

The scene signals are generated by devices installed in the vehicle 2, such as sensors. For example, a far-infrared camera, a pressure-sensitive film sensor, or a capacitance sensor installed in the vehicle 2 detects whether there is a passenger in the vehicle. A speed sensor installed in the vehicle 2 recognizes a stopped state and a driving state of the vehicle 2. The position of the vehicle 2 is obtained from a GPS (Global Positioning System) receiver. The facilities and constructions near the vehicle 2 are obtained based on the position of the vehicle 2 and map information.

The determining part 83 determines a level which indicates how strongly the vehicle 2 is restricted in the case of impairment of the functions of a plurality of ECUs, for example, the ECU 6 and ECU 7, having the same function in a scene indicated by the scene signals. Herein, the functions of the ECUs may be impaired by, for example, program defects, incomplete writing of a program due to a failed or stopped program update, and program infection with malware. When the function of an ECU is impaired, the function of the component of the vehicle 2 that is under the control of the ECU is also damaged, and this may place a restriction on the vehicle 2.

When determining the above-mentioned level, the determining part 83 takes into account the component to which each of the plurality of ECUs, e.g., the ECU 6 and ECU 7, is connected. For example, the ECU 6 is connected to the right headlight of the vehicle 2 and the ECU 7 is connected to the left headlight of the vehicle 2, and accordingly, the determining part 83 determines the level based on the premise that the two ECUs are each independent hardware.

For example, when the vehicle 2 is stopped, a passenger is in the vehicle 2, and the illuminance of the right and left headlights is less than a predetermined threshold, as shown in FIG. 3, the determining part 83 determines a level of "A" to indicate how strongly the vehicle is restricted when the function of the ECU 6 or ECU 7 is impaired. Level "A" means that the vehicle 2 is strongly restricted. The determining part 83 also determines a level of "A" when the vehicle 2 is driving, the vehicle 2 is located, for example, under an elevated structure, and the illuminance of the right and left headlights is less than a predetermined threshold. This is because there is greater need in the above two cases to avoid a situation in which the function of the right headlight controlled by the ECU 6 and the function of the left headlight controlled by the ECU 7 are further impaired from the current condition.

On the other hand, when the vehicle 2 is stopped and there is no passenger in the vehicle 2, the determining part 83 determines a level of "B" to indicate how strongly the vehicle is restricted when the function of the ECU 6 or ECU 7 is impaired, regardless of the illuminance of the right and left headlights. Level "B" means that the vehicle 2 is not so strongly restricted. The determining part 83 also determines a level of "B," regardless of the illuminance of the right and left headlights, when the vehicle 2 is located at, for example, a developer site. The determining part 83 also determines a level of "B" regardless of the scene, when the illuminance of the right and left headlights is equal to or higher than a predetermined threshold. This is because there is less need in the above cases to avoid a situation in which the function of the right headlight controlled by the ECU 6 and the function of the left headlight controlled by the ECU 7 are further impaired from the current condition, as compared to the cases where a level of "A" is determined.

The selecting part 84 selects an ECU for which a program update will be performed from among the plurality of ECUs, such as the ECU 6 and ECU 7, based on the level determined by the determining part 83.

For example, as shown in FIG. 4, when level "A" is determined, there is greater need to avoid a situation in which the functions of the ECU 6 and the ECU 7 are further impaired from the current condition due to a failure in the program update. Accordingly, the selecting part 84 selects the ECU 7, which is a slave ECU, as an ECU for which the program update will be performed, without selecting the ECU 6, which is a master ECU so that the function of the ECU 7 will also be impaired together with the impairment of the function of the ECU 6.

On the other hand, as shown in FIG. 4, when level "B" is determined, there is less need, as compared to the cases where level "A" is determined, to avoid a situation in which the functions of the ECU 6 and ECU 7 are further impaired from the current situation due to a failure in the program update. Accordingly, the selecting part 84 selects both the master ECU 6 and the slave ECU 7 as ECUs for which the program update will be performed.

At least one of the relationship shown in FIG. 3 and the relationship shown in FIG. 4 may be stored in advance in an internal or external storage medium of the program update management device 8.

The transmitting part 85 transmits signals indicating the results of selection by the selecting part 84 to each of the plurality of ECUs, e.g., the ECU 6 and ECU 7.

Next, an example of processing performed by the program update management device and the ECU according to the embodiment will be described, with reference to FIG. 5. The below description will be made concerning the ECU 6 as an example, but similar processing is also performed regarding the ECU 7 in each step.

In step S1, the receiving part 61 receives, from the data center 1, signals indicating that a program update should be performed.

In step S2, the authenticating part 62 performs device authentication.

Here, step S2 may be optional.

In step S3, the transmitting part 63 transmits signals requesting permission for the program update.

In step S4, the receiving part 81 receives the signals transmitted in step S3.

In step S5, the acquiring part 82 acquires scene signals indicating a scene in which the vehicle 2 is used.

In step S6, the determining part 83 determines a level indicating how strongly the vehicle 2 is restricted in the case of impairment of the respective functions of a plurality of ECUs having the same function in the scene represented by the scene signals acquired in step S5, for example, the functions of the ECU 6 and ECU 7.

In step S7, the selecting part 84 selects an ECU (e.g., the ECU 6) for which the program update will be performed from among the plurality of ECUs (e.g., the ECU 6 and ECU 7), based on the level determined in step S6.

In step S8, the transmitting part 85 transmits signals indicating the results of selection performed in step S7 to each of the plurality of ECUs (e.g., the ECU 6 and ECU 7).

In step S9, the receiving part 61 receives the signals transmitted in step S8.

In step S10, the determining part 64 determines whether the program update is allowed to be performed. When the determining part 64 determines that the program update is allowed to be performed (YES in step S10), the determining part 64 moves the processing to step S11. When the determining part 64 determines that the program update is not allowed to be performed (NO in step S10), the determining part 64 moves the processing to step S12.

In step S11, the updating part 65 performs the program update by receiving a program for the update from the data center 1, transmits signals indicating the results of the program update to the data center 1, and ends the processing.

In step S12, the updating part 65 transmits signals indicating that the program update has not been performed to the data center 1, and ends the processing.

An embodiment of the present disclosure has been described by way of example. The program update management device 8 according to the embodiment determines a level indicating how strongly the vehicle 2 is restricted in the case of impairment of the respective functions of a plurality of ECUs having the same function in a scene represented by the scene signals. The program update management device 8 then selects the ECU for which the program update will be performed from among the plurality of ECUs based on the determined level.

Accordingly, the program update management device 8 can avoid a situation in which the vehicle 2 is unnecessarily restricted, even when the function of the selected ECU is impaired by, for example, defects in the update program, incomplete writing of the update program due to a failed or stopped program update, or infection of the update program with malware. At the same time, as to the ECUs that do not place a strong restriction on the vehicle 2 even when their functions are impaired, the program update management device 8 can allow the program update to be performed at an early stage for such ECUs.

In the above embodiment, the ECU 6 and ECU 7 that control the right and left headlights, respectively, have been described as an example. However, the program update management device 8 can also perform similar processing for other ECUs if such ECUs have the same function.

The present disclosure is not limited to the above-described embodiment and may be carried out in other various ways without departing from the gist of the present disclosure. Accordingly, the above-described embodiment is just by way of example only in terms of every aspect, and should not be interpreted in a limiting manner. For example, each of the steps in the above-described processing may be performed in a different order, or two or more steps may be performed in parallel, as long as such change causes no contradiction in the content of the processing.

The present disclosure provides a program update management device that enables a program update to be performed at an early stage.

What is claimed is:

1. A vehicle comprising a first hardware ECU (Electronic Control Unit) embedded with a first program and a second hardware ECU embedded with a second program, which are used while the vehicle is running, wherein
the first program is to be updated, and
the vehicle is configured to permit an update of the first program if the second program includes a function equivalent to that achieved by the first program; and
a program update management ECU configured to:
determine a level indicating a degree of restriction of the vehicle when a respective function of the first program or second program is impaired, the first program and the second program having the same function in the vehicle; and
select, from the first program and the second program, the first program for which the update is to be performed, based on the level.

2. The vehicle according to claim 1, wherein the program update management ECU is configured to determine the level indicating a degree of restriction of the vehicle based on a scene in which the vehicle is used.

3. The vehicle according to claim 2, wherein the program update management ECU is configured to acquire a scene signal indicating the scene in which the vehicle is used.

4. The vehicle according to claim 1, wherein the program update management ECU is configured to determine the level by considering a component to which each of the first hardware ECU and the second hardware ECU is connected.

5. The vehicle according to claim 2, wherein the program update management ECU is configured to determine the level by considering a component to which each of the first hardware ECU and the second hardware ECU is connected.

6. The vehicle according to claim 3, wherein the program update management ECU is configured to determine the level by considering a component to which each of the first hardware ECU and the second hardware ECU is connected.

* * * * *